United States Patent [19]
Allen

[11] 3,788,533
[45] Jan. 29, 1974

[54] INDUSTRIAL PLATE GLASS CUTTER'S TABLE

[76] Inventor: Byron W. Allen, 188 South I Street, San Bernardino, Calif. 92410

[22] Filed: June 9, 1972

[21] Appl. No.: 261,388

[52] U.S. Cl................ 225/96.5, 225/93, 269/54.5
[51] Int. Cl............................................ C03b 33/02
[58] Field of Search........ 225/96, 96.5, 104, 103, 2, 225/93; 83/157, 404, 404.1, 404.2; 269/54.5, 289

[56] References Cited
UNITED STATES PATENTS

| | | | |
|---|---|---|---|
| 1,806,887 | 5/1931 | Bruno | 269/54.5 |
| 1,949,262 | 2/1934 | Stromelley | 269/54.5 |
| 2,243,668 | 5/1941 | Cash | 269/54.5 |
| 1,996,383 | 4/1935 | Miles | 225/103 |
| 3,465,934 | 9/1969 | Ono et al. | 225/103 |
| 3,668,955 | 6/1972 | Rupprecht et al. | 225/96.5 X |

Primary Examiner—Frank T. Yost
Attorney, Agent, or Firm—Dana E. Keech

[57] ABSTRACT

A flat 9 feet by 12 feet carpeted table having a series of retractable rollers along one edge and a field of pins concurrently extensible above or retractable flush with the carpeted face of the table, said table being tiltable between a position steeply inclined towards said rollers to receive on said table a sheet of plate glass resting edgewise on said rollers, and a horizontal table position in which said sheet is supported alternatively on said carpeted surface and on the extended pins to facilitate the manual scoring and then cracking of said plate along a line selectable from a wide variety of options. The retractability of said rollers beneath said carpeted face facilitates removing from the horizontal table the pieces into which said sheet is divided. Removal of the remnant of the sheet is facilitated by re-extending said rollers, shifting said remnant into edgewise contact with said rollers, tilting said table to maximum tilt and rolling said remnant over said rollers to a truck or to storage. The pins are provided optionally with freely rolling ball tips which facilitate horizontally shifting a glass piece while it is supported on said pins without scratching the same.

7 Claims, 12 Drawing Figures

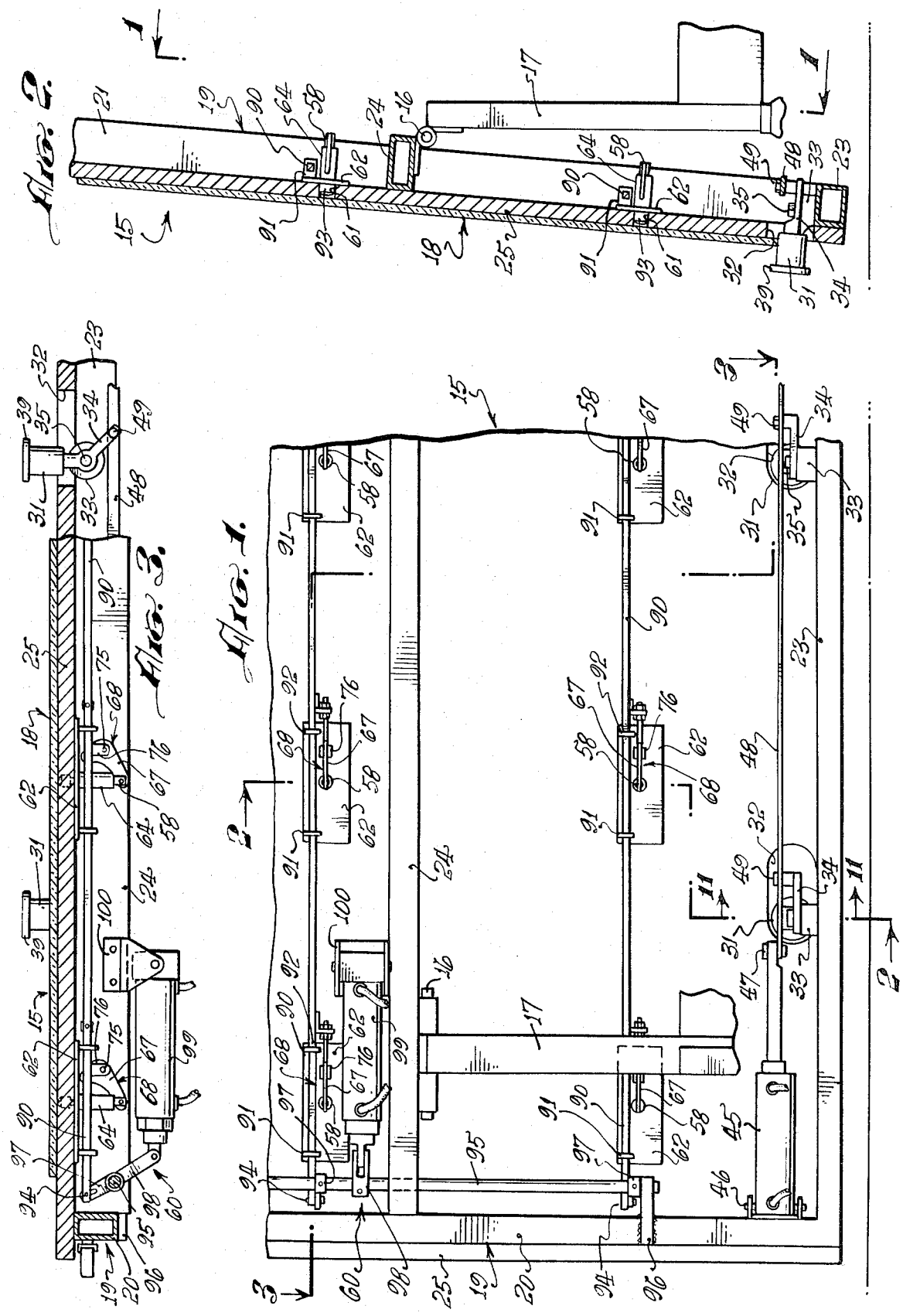

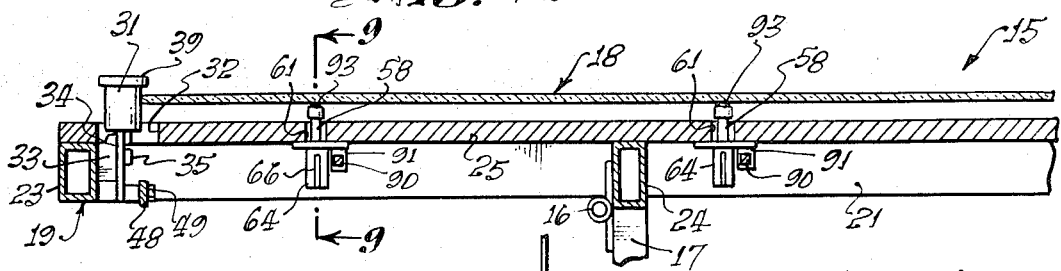
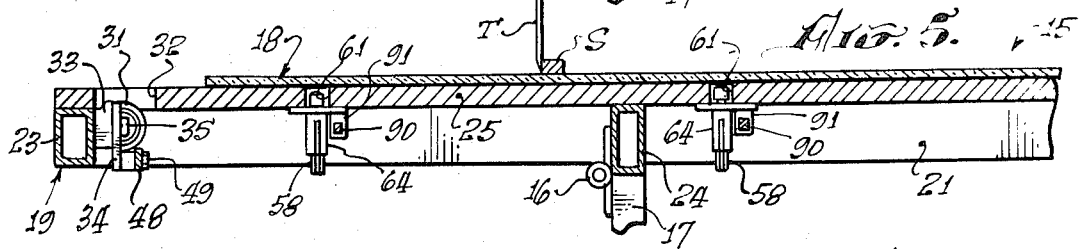
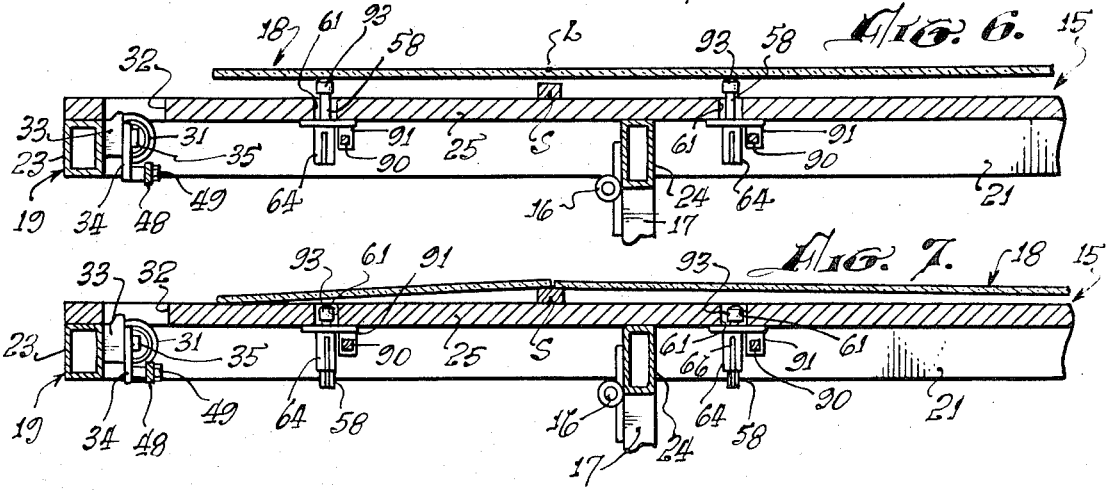
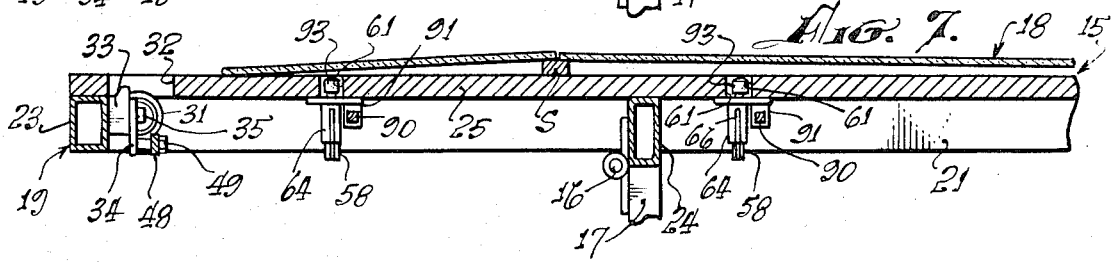
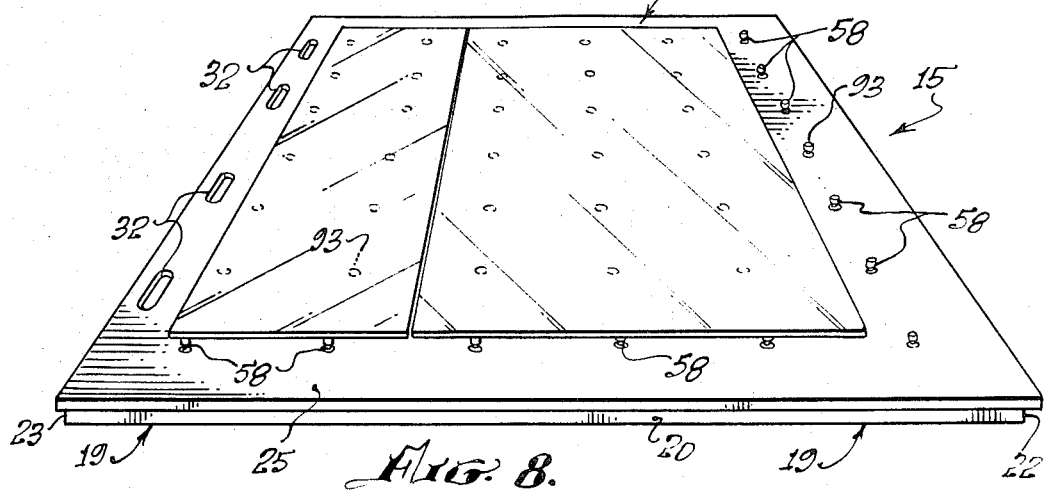

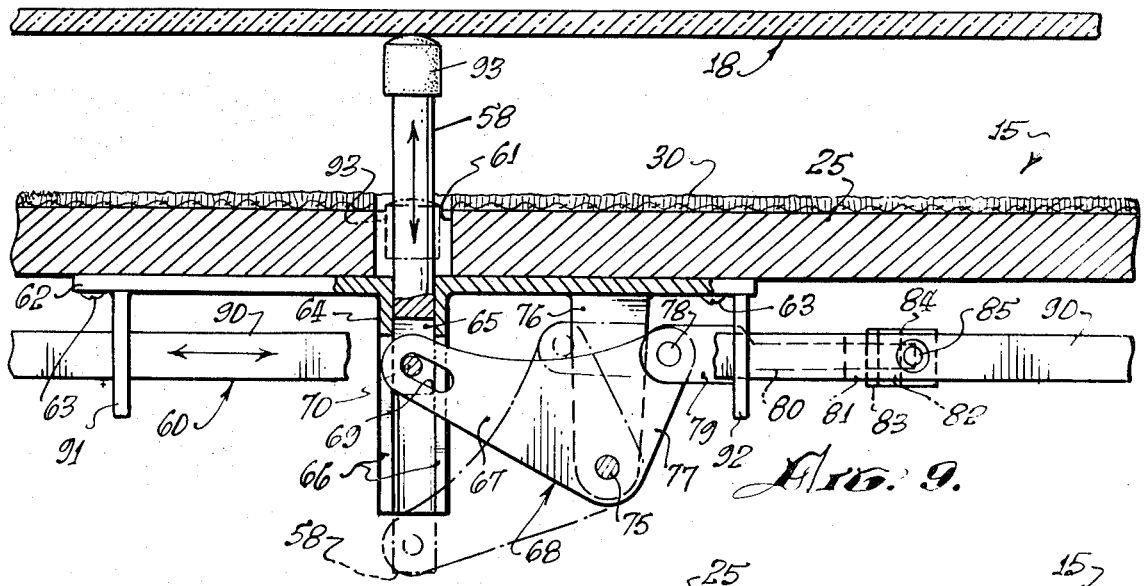
FIG. 9.
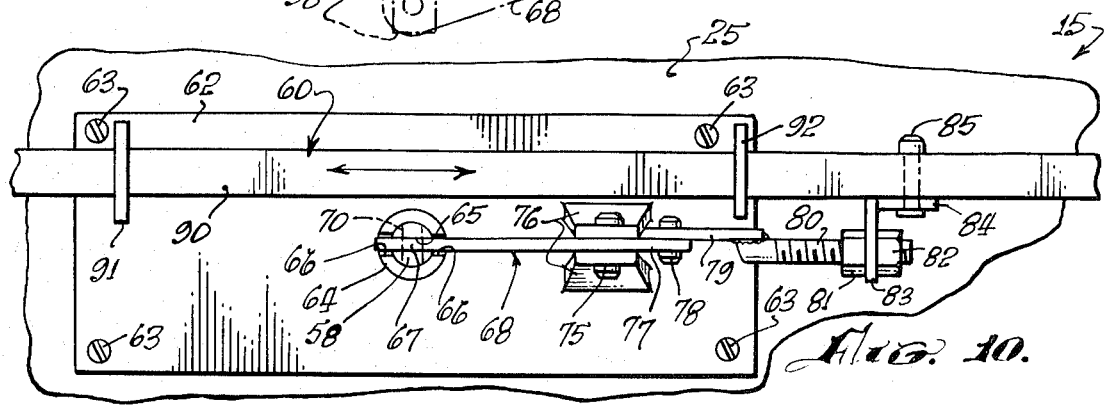
FIG. 10.
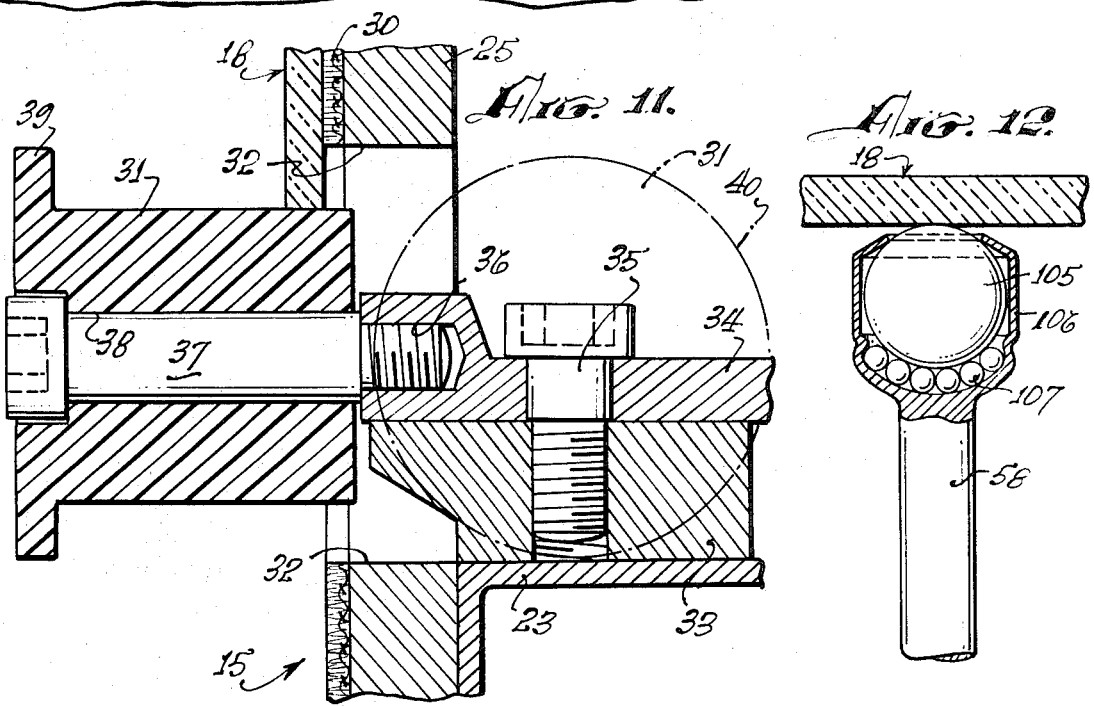
FIG. 11.
FIG. 12.

3,788,533

INDUSTRIAL PLATE GLASS CUTTER'S TABLE

SUMMARY OF INVENTION

While power actuated plate glass cutter's tables made and sold by me under my U.S. Pat. Nos. 3,570,733 and 3,570,734 issued Mar. 16, 1971, are leaders in their line, a new approach to the problem of utilizing a tilting table in cutting plate glass is found in the present invention which promises to decrease the cost and increase the productivity of this general type of industrial equipment.

For one thing, it is an object of the invention to provide such a table facilitating the ready handling of large, heavy glass pieces thereon without requiring a costly air flotation system.

Another object is to provide a plate glass cutter's table having means for manipulating the sheet to be cut which is less expensive than the breaker-bar equipment shown in said patents, yet highly efficient in operation.

A still further object is to provide a plate glass cutter's table having table-edge glass sheet supporting rollers on which a sheet may be supported on edge while being fed edgewise into position opposite the table with the latter steeply tilted and said rollers subsequently employed in a reverse but like manner to return to storage the larger of the pieces into which said sheet was divided.

A yet further object is to provide such a plate glass cutter's table having such rollers which are retractable beneath the table surface, with the latter disposed horizontally, so as not to interfere with dividing the glass sheet into pieces and removing the latter over whatever table edge is most convenient for this purpose.

Still another object of the invention is to provide a novel method of and apparatus for cutting sheets of plate glass involving the simple steps of (1) elevating a glass sheet uniformly a short distance above a horizontal table, (2) placing a scriber guide bar upon said sheet (either before or after the latter is so elevated) and scoring said sheet with reference to said bar, (3) inserting the same or a similar bar between said table and said sheet in alignment with said score line, and (4) withdrawing support uniformly from under said sheet excepting for the support afforded by said last mentioned bar and said table, and thereby causing said sheet to crack along said score line.

An additional object of the invention is the provision of a plate glass cutter's table having a field of retractable glass sheet supporting pins which are rollable ball tipped whereby, at any stage of the table's operation, where a glass sheet or a piece thereof rests upon said ball tipped pins, movement of said sheet and pieces in the next subsequent step in operating the table will be facilitated.

BRIEF DESCRIPTION OF THE DRAWINGS

FIG. 1 is a fragmentary rear elevational view of a preferred embodiment of the invention, this view being taken on the line 1—1 of FIG. 2.

FIG. 2 is a vertical sectional view taken on the line 2—2 of FIG. 1, this view showing the table of the invention in steeply inclined position with the glass sheet supporting rollers extended and with a sheet of glass supported on said rollers and resting against the table and with the glass sheet manipulating pins of the invention retracted flush with the surface of the table.

FIG. 3 is a horizontal sectional view taken on the line 3—3 of FIG. 1.

FIG. 4 is a view taken on the same line as FIG. 2 showing the table of the invention disposed in its horizontal position and with the field of pins provided in said table extended so as to elevate a sheet of glass just delivered onto said table into uniform spaced relation with said table.

FIG. 5 is a view similar to FIG. 4 showing said field of pins retracted and with said sheet of glass lowered onto the table and shifted away from said rollers thereby permitting the latter to be retracted beneath the carpeted surface of said table. This view also illustrates the application of a scriber bar to the upper surface of said sheet of glass and its being used to form a score line across said sheet.

FIG. 6 is a view similar to FIG. 5 and illustrates the next step in the use of the invention in which said field of pins is again extended to elevate the sheet of glass, which had just had a score line formed on the upper surface thereof, and also showing the removal of the scriber bar from above the glass and inserting it in the space between the glass and the table so as to rest on the table just beneath and in alignment with said score line.

FIG. 7 is a view similar to FIG. 6 and illustrates the next step in the method of using the present invention which consists in the retraction of said field of pins flush with the surface of said table thereby depositing said sheet of glass on said table and on said scriber bar with the result that the sheet is bent over said scriber bar in the area of said score line and cracked along said line.

FIG. 8 is a diagrammatic perspective view of the table of the invention illustrating the next step in the operation of the invention in which the field of pins provided in the table are again extended to simultaneously lift the pieces into which said sheet has been divided in spaced relation with the table thereby permitting the scribing bar to be withdrawn from between the glass and the table. It is to be noted that the earlier retraction of the series of rollers provided in the table now facilitates the removal of the smaller of the two pieces into which the sheet has been divided by merely manually shifting this piece horizontally from over the table.

FIG. 9 is an enlarged vertical sectional view taken on the line 9—9 of FIG. 4 and illustrates in detail the mechanism by which the glass sheet supporting pins of the invention are simultaneously extended or retracted.

FIG. 10 is a bottom plan of FIG. 9.

FIG. 11 is a full scale vertical sectional view taken on the line 11—11 of FIG. 1 and illustrates the internal structure of one of the glass sheet supporting rollers of the invention.

FIG. 12 is a full scale vertical sectional view of a modified form of one of the pins of the invention which is rollable ball tipped permitting a piece of sheet glass supported thereon to shift freely horizontally with a minimum of friction between the glass and the pin.

DETAILED DESCRIPTION OF THE PREFERRED EMBODIMENT

The invention is preferably embodied in an industrial plate glass cutter's table 15 which is pivotally mounted at 16 on a caster supported chassis 17, details of the latter being omitted from the present disclosure as these are clearly shown in U.S. Pat. No. 3,570,733 (supra). Suitable power means (not shown) are preferably embodied in the chassis 17 for swinging the table 15 at will between two extreme positions in one of which it is disposed horizontally, as shown in FIGS. 4–8 inclusive, and in the other of which it is steeply inclined as shown in FIGS. 1, 2 and 3. The table 15 is normally placed in its steeply inclined position for receiving a sheet 18 of plate glass, and in its horizontal position for use in the process of dividing said sheet into pieces. Smaller pieces thus separated from a large sheet are customarily manually removed from the table 15 while this is disposed horizontally. Where the renmant of a sheet of glass is too large to remove in this way, the tale is customarily shifted to its steeply inclined position for the removal of said remnant to storage.

The table 15 includes a perimetric frame 19 including side members 20 and 21 and top and bottom members 22 and 23 which are formed of hollow tubes rectangular in cross section and approximately 2 inches by 4 inches in size, said members being welded together at the corners of the frame and the said members 20 and 21 being connected by a 2 inches by 6 inches hollow tubular beam 24 which is pivotally hinged at 16 to the chassis 17 for mounting table 15 on the latter. A table top 25 is affixed to the frame 19 as by screws and preferably comprises a sheet of dense pressed board about ¾ of an inch thick. The top surface of top 25 is covered by a suitable layer of carpet 30. In most of the drawings, the table top 25 is shown diagrammatically as uncovered, the carpet 30 being shown only in the larger scaled views of FIGS. 9 and 11.

Mounted at spaced intervals on the bottom frame member 23 is a series of plate glass sheet-supporting rollers 31, ports 32 being formed in the table top 25 to permit these rollers to be retracted at will from their extended positions, shown in FIGS. 2, 3, 4 and 11, to their retracted positions, shown in FIGS. 5, 6, 7 and 8. Each of the rollers 31 is preferably cast or machined from a solid block of Teflon and is rotatably mounted on a base 33 which is welded onto bottom frame member 23 opposite one of the ports 32. Each base 33 has a bell crank 34 pivotally mounted thereon by a screw 35. Each bell crank 34 has a tapped radial hole 36 into which a roller axle 37 screws. Each roller 31 has a counter bored axial bore 38 for receiving an axle 37 and a radial flange 39 on its outer end.

The manner in which retraction of a roller 31 is accomplished by a 90° rotation of its bell crank 34 about its mounting screw 35 is shown in FIG. 11 in which the retracted position of the roller is indicated by broken line 40.

The movement of the rollers 31 between their extended positions and their retracted positions is produced by a simultaneous 90° rotation of bell cranks 34 effected by a hydraulic cylinder 45 mounted pivotally at one end at 46 on the frame 19 and connected pivotally at its opposite end at 47 to a rod 48 which pivotally connects at 49 to each of the bell cranks 34.

The hydraulic cylinder 45 is selected for this operation and so mounted that the limit stops provided by the piston of the cylinder automatically halts each movement of the piston with the rollers 31 precisely in their respective extended or retracted positions.

The whole upper surface of the table 15 of the invention is practically covered by a field of glass sheet supporting pins 58. A mechanism 60 is provided for power lifting said pins simultaneously so as to extend the same above the surface of the table 15 to uniformly support glass sheet 18 in horizontal spaced relation with the table as shown in FIGS. 8 and 9, or to retract said pins flush with table top 25. The pins 58 are preferably arranged in six rows of seven pins each and a hole 61 is provided in the tabletop 25 to freely receive each of the pins. Each pin 58 is mounted on a plate 62 which is secured to the tabletop 25 by screws 63, there being a tubular guide 64 welded to said plate (opposite a hole provided in the latter) so that the pin 58 is freely slideable through said plate and said guide. The lower end of the pin 58 is slotted at 65 and the guide 64 is slotted at 66 so that an arm 67 of a bell crank 68 freely extends through the slots in the pin 58 and guide 64 with a slot 69 in said receiving a pivot pin 70 mounted in the lower end of pin 58.

Bell crank 68 pivots on a pin 75 supported between the lower ends of two metal legs 76 which are welded to plate 62. The other arm 77 of bell crank 68 is connected by a pivot rivet 78 to a link 79 which is welded to a threaded rod 80 which extends through and is adjustably secured by nuts 81 and 82 to an apertured arm 83 of an angle bracket 84 which is pivotally secured by a pivot rivet 85 to a square rod 90, the latter being guided in square holes formed in lugs 91 and 92 which are welded to plate 62.

The upper end of each pin 58 is provided with a plastic cushioning cap 93 to prevent the glass sheet 18 being scratched by its contact with said pins.

The pins 58 in each of six rows thereof (see FIG. 8) are connected as above described to the same square rod 90. The left ends of these six rods 90 terminate a short distance from the left side frame member 20 as shown in FIGS. 1 and 3. These ends of square rods 90 are provided with pins 94. A shaft 95 journals at its opposite ends in bearings provided on arms 96 welded to frame side member 20 and also journals in suitable holes bored in main frame beam 24. At points opposite the respective square rods 90, shaft 95 is provided with short arms 97 each having a lengthwise slot for receiving a pin 94 of an adjacent square rod so that by rotation of shaft 95 all of the square rods 90 may be shifted lengthwise in unison for accomplishing the simultaneous and uniform extension or retraction of the pins 58. Also fixed on shaft 95 is an arm 98, the outer end of which is pivotally connected to one end of an extensible hydraulic power cylinder 99, the opposite end of which is pivotally mounted in a bracket 100 secured to the upper face of beam 24. Conventional means (not shown) is provided for actuating the cylinder 99 by supplying hydraulic fluid thereto, this means being remotely controlled to accomplish the extension or retraction of the entire field of pins 58 at will.

OPERATION

The table 15 of the present invention may be supplied with a sheet 18 of plate glass by either of two methods. Either the sheet can be lowered by a crane or other piece of equipment so as to move vertically into edgewise supported relation with the rollers 31 as shown in FIG. 2, or the sheet may be rolled edgewise from one side of the table along the length thereof while the lower edge of the glass sheet rests upon and is supported by the rollers 31. When the glass sheet has thus been delivered opposite the table, the sheet is, of course, swung towards the table so as to rest there-against as shown in FIG. 2 whereupon the table is now operated to swing the table into horizontal position with the plate resting flat against the tabletop 25, which it is understood is preferably always carpeted. Thus, when the table arrives in horizontal position as shown in FIG. 4, the glass sheet is normally resting directly upon the carpeted tabletop. This view illustrates the glass sheet supported on the upper ends of the uniformly extended pins 58 which of course is accomplished after the table reaches its horizontal position, this step being necessary to break the vacuum between the glass sheet and the tabletop before moving the glass sheet inwardly on the table away from over retraction ports 32 thereby permitting rollers 31 to be retracted as shown in FIG. 5. When this has been done, the next step is to employ a conventional scriber's bar S and glass cutter's tool T for producing a score line L on the upper surface of said glass plate as indicated in FIG. 5. The next step in the operation of the invention is to remove the scriber's bar S from above the sheet of glass 18 and insert this in the space between the sheet and the tabletop 25 with the bar in alignment with the score line L. While the method does not require that this use be made of the scriber's bar S, as any similar bar may be used for this purpose, it is generally more convenient to use the scriber's bar S than a separate bar for this purpose. In any event, the next step in the operation of the method is to lower the field of pins 58 from their extended position to their retracted positions, thus withdrawing support by said pins from said sheet. Dependence solely for support by the tabletop 25 and the scriber's bar S as shown in FIG. 7 results in the sheet 18 being placed under strain directly along the score line L causing the sheet to crack on this line as shown in FIG. 7.

FIG. 7 illustrates the breaking from the sheet 18 of a relatively narrow piece of glass and this is readily removed from the table manually, particularly as the sheet can be shifted almost directly horizontally from the table by virtue of the rollers 31 being retracted below the surface of the table.

FIG. 8 shows a slightly wider piece of glass cut from the main body of sheet 18 and this piece also may be readily removed from the table manually by a direct horizontal movement after lifting this piece from its supported relation with the pins 58.

Where a relatively large remnant of glass remains on the table after a cutting operation and it is desired to return this remnant to storage, this may be done by returning the rollers 31 to their extended positions after which the remnant of glass is shifted horizontally over the table into engagement with said rollers after which the table is tilted as shown in FIGS. 2 and 11 to rest the weight of the aforesaid remnant on said rollers in edgewise relation therewith thereby enabling said sheet to be either lifted vertically by a crane from said rollers or rolled lengthwise while still in edgewise supported relation with the rollers onto a truck or directly into storage depending upon the means available for receiving said remnant.

As an alternate form of plastic cushioning cap on the upper ends of glass sheet supporting pins 58, the invention embraces furnishing these pins with nylon or teflon balls 105, one of these being supported on the top of each of the pins 58 in a cup 106 which houses a layer of ball bearings 107 which allows each plastic ball 105 to freely rotate while it is supporting a sheet of glass thereby practically eliminating the possibility of scratching to occur incidental to the handling of a glass sheet 18 on the pins 58.

I claim:

1. An industrial plate glass cutter's table for use with a conventional scriber's bar, said table comprising:
    a flat table having a relatively non-abrasive upper surface for supporting horizontally a sheet of plate glass to be divided into two or more pieces; and
    a field of pins mounted in said table for uniform extension from said surface to support said sheet in parallel superposed relation therewith, and retractable at least flush with said surface to allow said sheet to come to rest on said surface or on any object interposed between said table and said sheet, such as said conventional scribing bar which latter has been previously used to score the upper surface of said sheet thereby causing the sheet to crack along the score line when said pins are retracted, said table being pivotally mounted for tilting between its horizontal position and a steeply inclined glass plate receiving position; and
    means at the lower edge of the inclined table to support such a plate edgewise when received on the inclined table.

2. An industrial plate glass cutter's table as recited in claim 1 wherein
    said edgewise plate supporting means comprises a series of rollers, the axes of which are normal to the plane of said table, said rollers being disposed at intervals along said edge of said table.

3. A table as recited in claim 2 wherein
    means is provided thereon for optionally retracting said rollers at least flush with said upper surface when said table is in its horizontal position.

4. A table as recited in claim 1 wherein
    the tip of each of said pins is provided with a rollable element facilitating horizontal movement of glass pieces supported on said pins when the latter are extended from said table.

5. A table as recited in claim 4 wherein
    said tip elements individually possess multidirectional rollability in whatever direction a glass piece supported thereon may be shifted.

6. A table as recited in claim 5 wherein
    said table is pivotally mounted for tilting between its horizontal position and a steeply inclined glass plate receiving position; and
    roller means comprising a series of rollers disposed at intervals along the lowered edge of said table for rollably supporting a glass sheet edgewise.

7. A table as recited in claim 6 wherein
    means is provided thereon for optionally retracting said rollers at least flush with said upper surface when said table is in its horizontal position.

* * * * *